April 7, 1964 — A. W. SMITH — 3,128,051

PUMP

Filed Nov. 7, 1960

INVENTOR.
ARTHUR W. SMITH
BY
George A. Maxwell
AGENT.

United States Patent Office 3,128,051
Patented Apr. 7, 1964

3,128,051
PUMP
Arthur W. Smith, La Habra, Calif.
(% Dag Mfg. Co., 11828 E. Algardi, Norwalk, Conn.)
Filed Nov. 7, 1960, Ser. No. 67,575
9 Claims. (Cl. 241—46)

This invention relates to a pump and is more particularly concerned with a submersible non-plugging and self-cleaning sump pump.

There are many situations where water so other fluids are gathered, or are collected, and must be pumped, bailed, or otherwise removed and disposed of. Frequently, these fluids carry foreign matter, such as straw, sticks, bits of wood, and other like foreign matter.

Examples of situations where fluids laden with foreign matter collect and must be pumped out, and disposed of, are flooded ditches, basements, holds of ships, sumps in oil fields, and the like, cesspools, and catch basins associated with numerous food handling operations, such as can be found in slaughter houses, and in citrus and vegetable packing houses.

In the above situations, due to the fibrous and solid foreign matter which is inevitably present, ordinary centrifugal and reciprocating pumps frequently cannot be used satisfactorily, since the foreign matter stops or plugs them up in such a manner as to render them ineffective.

In the past and in an effort to overcome the tendency for ordinary reciprocating or centrifugal pumps from becoming stopped up when used in situations where foreign matter is present, elaborate screening devices have been provided or extremely large, heavy and costly pumps having a capacity to pass the foreign matter expected to be encountered have been used.

In situations where large capacity pumps are employed, the pumped fluid and matter carried thereby is usually simply transferred from one location to another and is such that it cannot be exhausted into an ordinary sewer or waste system, since the foreign matter is not broken up or reduced in size so that it would not bridge and plug up the system.

In many other situations where fluids ladened with foreign matter are being handled and moved, so called vacuum tanks are employed. This means of moving fluids and matter involves a large receiver tank, an air exhaust pump related to the tank and a suction hose extending from the tank and adapted to be inserted in a sump or cespool. The water and waste in this set-up is drawn into the receiver tank. When the tank is full, the pump operation is stopped long enough to transfer and dispose of the materials collected thereby in any suitable or desirable manner.

Again, in the last-mentioned means for handling fluids ladened with foreign matter, the foreign matter is not acted upon or broken up in such a manner as would permit its being disposed of in and through an ordinary sewer system.

An object of my invention is to provide a novel centrifugal type pump for handling fluids and foreign matter carried by the fluids.

Another object of my invention is to provide a pump of the character referred to having means related thereto which cuts and finely chops up foreign matter carried by the fluid so that it cannot plug or foul the pump and so that it can be easily and conveniently deposited in and handled by any conventional sewer or waste system.

An object of my invention is to provide a centrifugal type pump having a cylindrical, downwardly opening body with a tangentially disposed outlet opening spaced above the lower open end thereof, a disc-shaped rotor within the body, an annular ring with inwardly disposed, inclined cutting and flow directing teeth in the body to surround the rotor and defining an inlet opening, substantially radially disposed, downwardly projecting pumping and casting vanes on the rotor and cooperatively related with the ring to cast fluid and material onto and between the teeth and urge the fluid and material between the teeth to be directed upwardly thereby into the body, and substantially radially disposed, upwardly projecting and radially outwardly extending pumping and cutting vanes on the rotor and cooperatively related with the teeth on the ring to shear material engaged therebetween and to urge the fluid and material out through the outlet opening in the body.

A further object of my invention is to provide a pump of the character referred to having circumferentially spaced, inclined, or pitched fluid conducting ports in the rotor to keep the pump primed and to assure a sufficient flow of fluid therethrough to carry the matter being handled.

An object of this invention is to provide a pump of the character referred to that is both easy and economical to manufacture and which is both highly effective and dependable in operations.

The various objects and features of my invention will be fully understood from the following detailed description of a typical preferred form and application of my invention, throughout which description reference is made to the accompanying drawings, in which.

Figure 1:
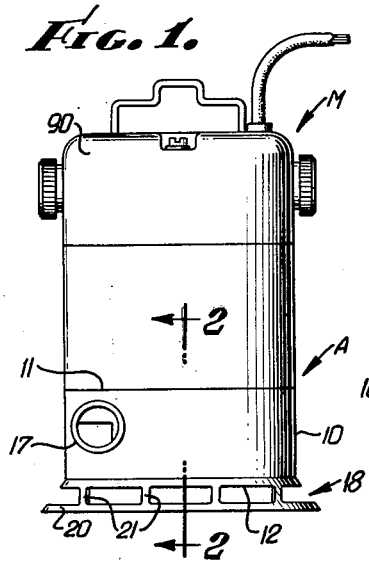
FIG. 1 is a side elevational view of my new pump.
Figure 3:
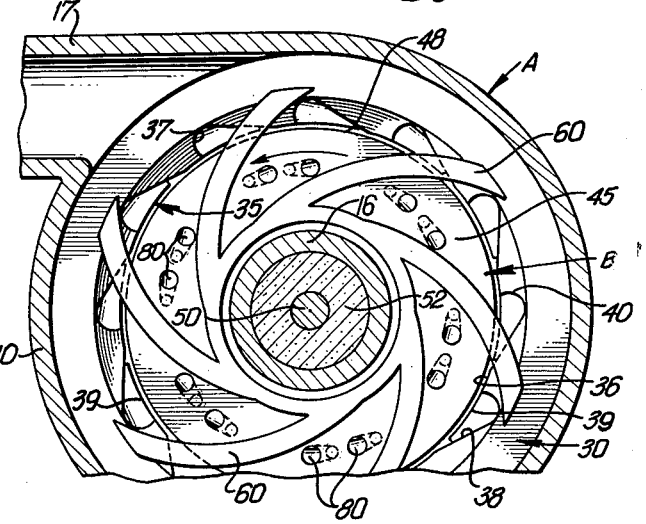
FIG. 3 is a sectional view taken as indicated by line 3—3 on FIG. 2.

The pump provided by the present invention is submersible centrifugal type pump and is shown as including generally, a pump body A, a rotor B within the body A and a prime mover M carried by the body and coupled to and driving the motor.

The body A is an elongate, vertically disposed cylindrical member having a cylindrical side wall 10 and open top 11, an open bottom 12 and a horizontally disposed partition 13 intermediate the top and bottom.

The partition 13 is inclined downwardly and inwardly and is provided at its center with a central shaft opening 14, an upwardly projecting annular bearing supporting flange 15 surrounding the opening 14 and a downwardly projecting annular seal supporting flange 16 surrounding the opening 14.

In addition to the foregoing, the body A is further provided with a discharge duct 17 and a supporting means 18.

The discharge duct is a simple, tubular part formed integrally with the side wall of the body to project tangentially from the said side wall and to communicate with the interior of the body below the partition 13 therein. The outer end of the discharge duct is adapted to be engaged in a hose or the like, and into which the material being pumped is delivered for disposal.

The supporting means 18 that I provide involves an annular supporting ring 20 spaced below the bottom of the body and a plurality of circumferentially spaced legs 21 fixed to and extending between the ring and the body. In practice, the means 18 is formed integrally with the body and the ring is, as shown, of greater diametric extent than the body and so that it provides great stability.

The means 18 serves to maintain the bottom open end of the body spaced above and clear of the surface upon which the pump is engaged and is such that it will not impede or prevent the free flow of fluids into the pump.

Engaged in the lower end portion of the body is an annular jaw ring 30, which ring establishes what is, in effect, and which may be termed a bottom wall in the body and which defines a central downwardly opening inlet opening 31.

The jaw ring 30 which resembles an internal ring gear is formed of a hard metal and is of internal helical design. The ring is characterized by flat, horizontally disposed top and bottom walls 32 and 33, a cylindrical outer wall 34 and is provided about its inner periphery with a plurality of diagonally circumferentially cut spaced teeth 35.

The teeth 35 extend diagonally between the top and bottom walls of the ring and each is shown as having a cylindrical radially inwardly disposed land 36, a semi-circular front face 37 and straight, slanted rear face 38.

The semi-circular front face of the teeth oppose the direction of rotation of the rotor, as will hereinafter be described and are slightly recurvant where they intersect the lands 36 so that they cooperate therewith to establish longitudinally disposed cutting edges 39 opposing the direction of the rotation of the rotor. The front faces 37 of the teeth converge with the top wall 32 of the ring to define arcuate shearing edges 40, which, like the edges 39 oppose the direction of rotation of the rotor and cooperate with the parts thereof as will hereinafter be described.

The flat, slanted rear faces 38 of the teeth 35 extend tangentially from the front face 37 of the next or following tooth to intersect or join the land 36, as clearly illustrated throughout the drawings.

In addition, the teeth are inclined circumferentially and upwardly in the direction of rotation of the rotor and so that they serve to catch and direct fluid and matter cast radially therebetween, upwardly in the body. It will be further apparent that the front walls 37 being semi-circular and slightly recurvant and the rear walls being slanted so as to expose the front wall of the tooth adjacent thereto, the teeth cooperate to establish inclined scoop-like channels in the ring, which serve to catch fluid matter moving circumferentially within the ring and direct it upwardly in the body.

In the case illustrated, the inner peripheral portion of the top wall 32 is inclined radially inwardly and downwardly at the same angle as the partition 13 in the body.

The ring 30 is slidably engaged in the lower open end of the body and is secured therein, with the top wall thereof spaced a predetermined distance below the partition 13, as by means of a plurality of circumferentially spaced screw fasteners 41 carried by the side wall of the body and engaged in the ring.

The rotor B that I provide is a simple, unitary, substantially disc-shaped member having radially inwardly and downwardly inclined top and bottom surfaces 45 and 46, a central hub portion 47 and a cylindrical vertically disposed outer edge 48.

The rotor B is carried by a drive shaft 50 projecting through the opening 14 in the body partition 13 and rotatably supported by a suitable anti-friction bearing 51 supported by the bearing supporting flange 15 on the partition. The top of the hub portion 47 of the rotor is flat and establishes sealing engagement with a suitable annular fluid seal 52 engaged in and supported by the seal supporting flange 16 on the body partition.

The rotor is positioned to occur with in the confines of the jaw ring, with the top surface thereof in the same plane as the inclined inner peripheral portion of the top of the ring and is of such diametric extent to just maintain running clearance in the ring.

The bottom surface 46 of the rotor is spaced above the bottom end of the ring 30.

The top surface 45 of the rotor B is provided with a plurality of circumferentially spaced, radially outwardly projecting helically curved vanes 60. The vanes 60 are formed integrally on the rotor, are substantially square in cross-section and extend from the bearing flange to a point spaced radially outwardly of the outer edge of the rotor.

The outer end portions of the vanes, which project radially from the rotor, project between the partition 13 in the body and the top of the jaw ring 30 with running clearance and terminate radially inwardly of the side wall of the body.

With the above relationship of parts, it will be apparent that the outer portions of the vanes 60 cooperate with the ring side wall and partition to define an annular fluid chamber X and also cooperate with the teeth on the jaw ring to act as shearing blades.

The vanes 60 are curved helically rearwardly to the direction of rotation and so that the outer portions thereof are slanted away from the front faces of the teeth as they extend outwardly. With this relationship of parts, it will be apparent that material extending upwardly from between the teeth on the jaw ring 30 is, when engaged by the vanes 60, urged radially outwardly and circumferentially into engagement in the semi-circular front faces of the teeth. Upon further rotation of the rotor and advancement of the vanes, the material between the teeth and the vanes is sheared. The portion of the sheared material which was engaged by the vanes is thereafter cast circumferentially and radially by the vanes into the chamber X and flows therethrough and out through the duct 17 which communicates with the said chamber.

Figure 2:
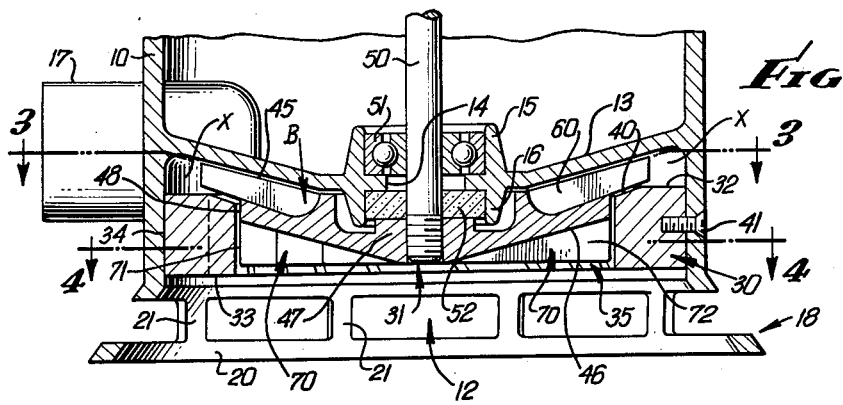
FIG. 2 is a sectional view of a portion of the pump that I provide, taken substantially as indicated by line 2—2 on FIG. 1.
Figure 4:
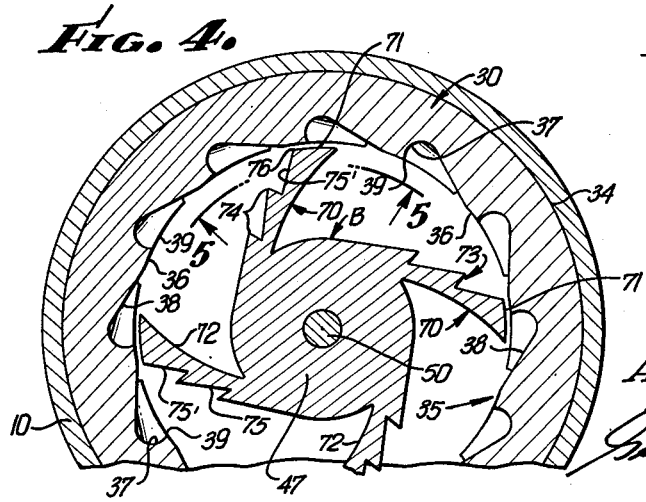
FIG. 4 is a sectional view taken as indicated by line 4—4 on FIG. 2.
Figure 5:
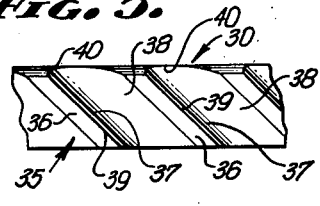
FIG. 5 is a sectional view of a portion of my new construction taken as indicated by line 5—5 on FIG. 4.

The lower surface of the rotor B is provided with a plurality of substantially radially disposed impellers 70. The impellers 70 are formed integrally on the rotor and project downwardly therefrom, to terminate in a horizontal plane spaced slightly above the bottom plane of the jaw ring 30, as clearly illustrated in FIG. 2.

Each impeller is inclined helically rearwardly to the direction of rotation and terminates at its outer end at a vertically disposed end face 71 which opposes the teeth on the jaw ring with running clearance.

The back or trailing face 72 of each impeller is plain and unobstructed while the front or leading face is stepped to establish a plurality of radially spaced, vertically extending teeth 73 with vertical cutting edges 74 and substantially radially outwardly extending, vertically disposed lands 75. The outermost land 75' on each impeller converges with the end face 71 to define a cutting edge 76 which advances towards the cutting edges of the teeth on the jaw ring and cooperates therewith to shear and cut matter therebetween.

The lands 75 converge with the bottom of the cutter to define horizontal downwardly and forwardly disposed cutting edges 76.

In operation, the impellers 70 cause fluids to flow radially outwardly and into the scoops defined by the teeth on the jaw ring, to be directed upwardly thereby to be engaged by the vanes and thence urged or cast into the chamber X for discharge outwardly through the duct 17.

Further, in operation, solid matter carried by the fluid is engaged by the impellers 70. Certain of such matter is broken up by the impact of the impellers while other of such matter is chopped and broken up by the cutting edges 74 of the teeth, the cutting edges 76 and the forwardly disposed points defined by the edges 74 and 76, where they converge. In addition to the above, solid matter engaged by the impellers is cast radially outwardly and circumferentially thereby into engagement with the teeth on the jaw ring 30 to be cut or broken thereagainst or to be caught thereby for subsequent shearing by the cutting edges 76 of the impellers.

The stepped effect on the leading or front faces of the impellers causes the solids to travel irregularly therealong and in such a manner that they will not tend to lodge and become caught or packed thereon.

From the foregoing, it will be apparent that the pump that I provide is such that it will not load up or become packed with foreign matter, and rendered useless, but rather, is such that it will cut, crush and/or pulverize foreign matter in such a way that it can be readily carried by the fluid being handled and discharged therewith.

It will be apparent that in many situations, the ratio of fluid and solids can reach a point where, due to the concentration of solids at the perimeter of the rotor, sufficient water or liquid to assure a free flow and carrying away of the matter is impeded.

In such situations, a heavy sludge may be created which will not flow properly through the pump.

To overcome the above possible condition from arising I provide a supplemental water or liquid supply or pumping means, which means includes a plurality of circumferentially spaced apertures 80 in the rotor, between the vanes and impellers and spaced radially inwardly from the periphery of the rotor. The apertures are, as illustrated, preferably inclined so that their lower open ends lead the upper open ends as the rotor is revolved and so that a scooping effect is gained.

In operation, the centrifugal action of the vanes creates a minus pressure in the construction above the rotor which draws sufficient fluid upwardly through the apertures 80 to assure adequate water or liquid to carry the solids entering the construction. As the solids become more abundant and the material passed by the rotor and jaw ring becomes more dense, the vacuum in the construction increases and proportionately more water is drawn in. When the liquid is relatively clean and little solid matter is present, a lesser amount of water is drawn through the apertures.

In practice, the apertures are preferably downwardly and inwardly convergent and so that the lower inlet end is slightly smaller than the upper outlet end. With this relationship of parts, it will be seen that the apertures are self-cleaning and are not subject to becoming plugged.

Any particles which will enter the inlet end of the apertures will flow freely through the remainder thereof. Any particles which might lodge in the inlet ends of the apertures must necessarily project downwardly from the rotor, and between the impellers. As a result, such particles are so disposed as to be in the paths of one or more of the many particles being moved about by the impellers and are subject to being immediately struck and dislodged from the apertures.

With the above construction, it will be apparent that the supplemental water supply or priming means is such that it will not become plugged and is such that it assures a constant supply of water, above the rotor, to assure proper carrying away of the solid matter being handled.

The prime mover carried by the body and coupled to and driving the rotor is a simple electric motor (not shown) housed in a suitable water proof shell 90 cooperatively related and fixed to the top of the body. The drive shaft 50 connected with the rotor B can, in practice, be the main power shaft of the motor.

In practice, the prime mover could be an internal combustion engine or other suitable drive means and could, if desired, be supported in spaced relationship above the pump by means of a standard or other suitably supporting means projecting upwardly from the body.

Since the prime mover M can vary widely in form and construction without affecting the novelty of the present invention, I will not burden this application with further details of the prime mover shown or with details of other apparent modifications.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. A pump of the character referred to including, a cylindrical body having a closed top, and an open bottom, an annular jaw ring engaged in the lower open end of the body, an exhaust duct projecting laterally from the body and communicating with the space between the top of the body and the jaw ring, a drive shaft projecting through the top of the body and a disc-shaped rotor on the shaft to occur within the confines of the jaw ring, said jaw ring having a plurality of circumferentially spaced, radially inwardly projecting, substantially vertically disposed teeth, said rotor having a plurality of circumferentially spaced, substantially radially disposed vanes projecting from its top and having ends projecting radially outwardly from the rotor, to extend between the top of the body and the jaw ring and having a plurality of substantially radially disposed impellers projecting from its bottom and having ends opposing the teeth on the jaw ring, and a plurality of circumferentially spaced fluid conducting apertures extending between the top and bottom of the rotor and spaced radially inwardly from the peripheral edge thereof.

2. A pump of the character referred to including, a cylindrical body having a closed top, and an open bottom, an annular jaw ring engaged in the lower open end of the body, an exhaust duct projecting laterally from the body and communicating with the space between the top of the body and the jaw ring, a drive shaft projecting through the top of the body and a disc-shaped rotor on the shaft to occur within the confines of the jaw ring, said jaw ring having a plurality of circumferentially spaced, radially inwardly projecting, substantially vertically disposed teeth, said rotor having a plurality of circumferentially spaced, substantially radially disposed vanes projecting from its top and having ends projecting radially outwardly from the rotor, to extend between the top of the body and the jaw ring and having a plurality of substantially radially disposed impellers projecting from its bottom and having ends opposing the teeth on the jaw ring, and a plurality of circumferentially spaced fluid conducting apertures extending between the top and bottom of the rotor and spaced radially inwardly from the peripheral edge thereof, said apertures being inclined downwardly and forwardly in the direction of rotation of the rotor.

3. A pump of the character referred to including, a cylindrical body having a closed top, and an open bottom, an annular jaw ring engaged in the lower open end of the body, an exhaust duct projecting laterally from the body and communicating with the space between the top of the body and the jaw ring, a drive shaft projecting through the top of the body and a disc-shaped rotor on the shaft to occur within the confines of the jaw ring, said jaw ring having a plurality of circumferentially spaced, radially inwardly projecting, substantially vertically disposed teeth, said rotor having a plurality of circumferentially spaced, substantially radially disposed vanes projecting from its top and having ends projecting radially outwardly from the rotor, to extend between the top of the body and the jaw ring and having a plurality of substantially radially disposed impellers projecting from its bottom and having ends opposing the teeth on the jaw ring, and a plurality of circumferentially spaced fluid conducting apertures extend between the top and bottom of the rotor and spaced radially inwardly from the peripheral edge thereof, said apertures being inclined downwardly and forwardly in the direction of rotation of the rotor, and being downwardly convergent so that their lower inlet ends are smaller than the remainder of the apertures and their outlet ends.

4. A pump of the character referred to including, a cylindrical body having a closed top, and an open bottom, an annular jaw ring engaged in the lower open end of the body, an exhaust duct projecting laterally from the body and communicating with the space between the top of the body and the jaw ring, a drive shaft projecting through the top of the body and a disc-shaped rotor on the shaft to occur within the confines of the jaw ring, said jaw ring having a plurality of circumferentially spaced, radially inwardly projecting substantially vertically disposed teeth, said rotor having a plurality of circumferentially spaced, substantially radially disposed vanes projecting from its top and having ends projecting radially outwardly from the rotor, to extend between the top of the body and the jaw ring and having a plurality of substantially radially disposed impellers projecting from its bottom and having ends opposing the teeth on the jaw ring, said teeth on the ring jaws being inclined upwardly and forwardly in the direction of rotation of the rotor and having cutting edges opposing the direction of rotation of the rotor to oppose and cooperate with the ends of the impellers to shear matter engaged therebetween, and a plurality of circumferentially spaced, fluid conducting apertures extending between the top and bottom of the rotor and spaced radially inwardly from the peripheral edge thereof.

5. A pump of the character referred to including, a cylindrical body having a closed top, and an open bottom, an annular jaw ring engaged in the lower open end of the body, an exhaust duct projecting laterally from the body and communicating with the space between the top of the body and the jaw ring, a drive shaft projecting through the top of the body and a disc-shaped rotor on the shaft to occur within the confines of the jaw ring, said jaw ring having a plurality of circumferentially spaced, radially inwardly projecting substantially vertically disposed teeth, said rotor having a plurality of circumferentially spaced, substantially radially disposed vanes projecting from its top and having ends projecting radially outwardly from the rotor, to extend between the top of the body and the jaw ring and having a plurality of substantially radially disposed impellers projecting from its bottom and having ends opposing the teeth on the jaw ring, said teeth on the ring jaws being inclined upwardly and forwardly in the direction of rotation of the rotor and having cutting edges opposing the direction of rotation of the rotor to oppose and cooperate with the ends of the impellers to shear matter engaged therebetween, said apertures being inclined downwardly and forwardly in the direction of rotation of the rotor.

6. A pump of the character referred to including, a cylindrical body having a closed top, and an open bottom, an annular jaw ring engaged in the lower open end of the body and communicating with the space between the top of the body and the jaw ring, a drive shaft projecting through the top of the body and a disc-shaped rotor on the shaft to occur within the confines of the jaw ring, said jaw ring having a plurality of circumferentially spaced, radially inwardly projecting substantially vertically disposed teeth, said rotor having a plurality of circumferentially spaced, substantially radially disposed vanes projecting from its top and having ends projecting radially outwardly from the rotor, to extend between the top of the body and the jaw ring and having a plurality of substantially radially disposed impellers projecting from its bottom and having ends opposing the teeth on the jaw ring, said teeth on the ring jaws being inclined upwardly and forward in the direction of rotation of the rotor and having cutting edges opposing the direction of rotation of the rotor to oppose and cooperate with the ends of the impellers to shear matter engaged therebetween, and being downwardly convergent so that their lower inlet ends are smaller than the remainder of the apertures and their outlet ends.

7. A pump of the character referred to including, a cylindrical body having a closed top, and an open bottom, and an annular jaw ring engaged in the lower open end of the body, an exhaust duct projecting laterally from the body and communicating with the space between the top of the body and the jaw ring, a drive shaft projecting through the top of the body and a disc-shaped rotor on the shaft to occur within the confines of the jaw ring, said jaw ring having a plurality of circumferentially spaced, radially inwardly projecting, substantially vertically disposed teeth, said rotor having a plurality of circumferentially spaced, substantially radially disposed vanes projecting from its top and having ends projecting radially outwardly from the rotor, to extend between the top of the body and the jaw ring and having a plurality of substantially radially disposed impellers projecting from its bottom and having ends opposing the teeth on the jaw ring, and a plurality of circumferentially spaced fluid conducting apertures extending between the top and bottom of the rotor and spaced radially inwardly from the peripheral edge thereof, said apertures being inclined downwardly and forwardly in the direction of rotation of the rotor, and being downwardly convergent so that their lower inlet ends are smaller than the remainder of the apertures and their outlet ends, said teeth on the ring jaw having circumferentially curved, radially inwardly disposed inner faces, straight, radially outwardly inclined rear faces and arcuate front faces opposing the direction of rotation of the rotor and converging with the inner faces to define axial cutting edges and converging with the top of the ring to define arcuate, substantially, horizontally disposed cutting edges, said teeth cooperating to define a plurality of circumferentially spaced, upwardly inclined scoop-like grooves to receive fluid urged radially outwardly by the impellers and direct it upwardly past the rotor to be engaged by the vanes.

8. A pump of the character referred to including, a cylindrical body having a closed top, and an open bottom, an annular jaw ring engaged in the lower open end of the body, an exhaust duct projecting laterally from the body and communicating with the space between the top of the body and the jaw ring, a drive shaft projecting through the top of the body and a disc-shaped rotor on the shaft to occur within the confines of the jaw ring, said jaw ring having a plurality of circumferentially spaced, radially inwardly projecting, substantially vertically disposed teeth, said rotor having a plurality of circumferentially spaced, substantially radially disposed vanes projecting from its top and having ends projecting radially outwardly from the rotor, to extend between the top of the body and the jaw ring and having a plurality of substantially radially disposed impellers projecting from its bottom and having ends opposing the teeth on the jaws ring, said teeth on the ring jaw having circumferentially curved, radially inwardly disposed inner faces, straight, radially outwardly inclined rear faces and arcuate front faces opposing the direction of rotation of the rotor and converging with the inner faces to define axial cutting edges and converging with the top of the ring, to define arcuate, substantially horizontally disposed cutting edges, said teeth cooperating to define a plurality of circumferentially spaced, upwardly inclined scoop-like grooves to receive fluid urged radially outwardly by the impellers and direct it upwardly past the rotor to be engaged by the vanes, the portions of the vanes projecting from the rotor having forwardly and downwardly disposed cutting edges to cooperate with the arcuate cutting edges defined by the teeth to shear solid matter engaged therebetween, said impellers having axially disposed front faces opposing the direction of rotation of the rotor and having axially disposed cutting edges at their outer ends to oppose the axial cutting edges of the teeth, said front face of the impellers being stepped to establish a plurality of substantially radially extending lands, and a plurality of circumferentially spaced, fluid conducting apertures extending between the top and bottom of the rotor and spaced radially inwardly from the peripheral edge thereof, said apertures being included downwardly and forwardly in the direction of rotation of the rotor.

9. A pump of the character referred to including, a cylindrical body having a closed top, and an open bottom, an annular jaw ring engaged in the lower open end of the body, an exhaust duct projecting laterally from the body and communicating with the space between the top of the body and the jaw ring, a drive shaft projecting through the top of the body and a disc-shaped rotor on the shaft to occur within the confines of the jaw ring, said jaw ring having a plurality of circumferentially spaced, radially inwardly projecting, substantially vertically disposed teeth, said rotor having a plurality of circumferentially spaced, substantially radially disposed vanes projecting from its top and having ends projecting radially outwardly from the rotor, to extend between the top of the body and the jaw ring and having a plurality of substantially radially disposed impellers projecting from its bottom and having ends opposing the teeth on the jaws ring, said teeth on the ring jaw having circumferentially curved, radially inwardly disposed inner faces, straight, radially outwardly inclined rear faces and arcuate front faces opposing the direction of rotation of the rotor and converging with the inner faces to define axial cutting edges and converging with the top of the ring, to define arcuate, substantially horizontally disposed cutting edges, said teeth cooperating to define a plurality of circumferentially spaced, upwardly inclined scoop-like grooves to receive fluid urged radially outwardly by the impellers and direct it upwardly past the rotor to be engaged by the vanes, the portions of the vanes projecting from the rotor having forwardly and downwardly disposed cutting edges to cooperate with the arcuate cutting edges defined by the teeth to shear solid matter engaged therebetween, said impellers having axially disposed front faces opposing the direction of rotation of the rotor and having axially disposed cutting edges at their outer ends to oppose the axial cutting edges of the teeth, said front faces of the impellers being stepped to establish a plurality of substantially radially extending lands, and a plurality of circumferentially spaced, fluid conducting apertures extending between the top and bottom of the rear and spaced radially inwardly from the peripheral edge thereof, said apertures being inclined downwardly and forwardly in the direction of rotation of the rotor, and being downwardly convergent so that their lower inlet ends are smaller than the remainder of the apertures and their outlet ends.

References Cited in the file of this patent

UNITED STATES PATENTS

| | | |
|---|---|---|
| 206,494 | Shultes | July 30, 1878 |
| 2,496,359 | Rymann | Feb. 7, 1950 |
| 2,577,152 | Powers | Dec. 4, 1951 |
| 2,824,702 | Lee | Feb. 25, 1958 |
| 2,853,249 | Wilder | Sept. 23, 1958 |
| 2,918,876 | Howe | Dec. 29, 1959 |